US011075416B2

(12) United States Patent
Günther

(10) Patent No.: US 11,075,416 B2
(45) Date of Patent: Jul. 27, 2021

(54) TEMPERATURE-CONTROL DEVICE FOR A BATTERY HOUSING OF A VEHICLE

(71) Applicant: Kirchhoff Automotive Deutschland GmbH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 79 days.

(21) Appl. No.: 16/320,063

(22) PCT Filed: Jul. 19, 2017

(86) PCT No.: PCT/EP2017/068211
§ 371 (c)(1),
(2) Date: Jan. 23, 2019

(87) PCT Pub. No.: WO2018/024483
PCT Pub. Date: Feb. 8, 2018

(65) Prior Publication Data
US 2019/0252741 A1    Aug. 15, 2019

(30) Foreign Application Priority Data

Aug. 1, 2016    (DE) .......................... 102016114216.6

(51) Int. Cl.
*H01M 10/613* (2014.01)
*H01M 10/6568* (2014.01)
(Continued)

(52) U.S. Cl.
CPC ....... *H01M 10/625* (2015.04); *H01M 10/613* (2015.04); *H01M 10/647* (2015.04);
(Continued)

(58) Field of Classification Search
CPC ............. H01M 10/625; H01M 10/613; H01M 10/647; H01M 10/6555; H01M 10/6557;
(Continued)

(56) References Cited

U.S. PATENT DOCUMENTS 10,424,770 B2    9/2019  Günther
2007/0026301 A1  2/2007  Lee et al.
(Continued)

FOREIGN PATENT DOCUMENTS

CN    1905268 A    1/2007
CN    103219559 A    7/2013
(Continued)

OTHER PUBLICATIONS

EPO machine generated English translation of JP-2008059950-A (Year: 2008).*
(Continued)

*Primary Examiner* — Christopher P Domone
*Assistant Examiner* — Kimberly Wyluda
(74) *Attorney, Agent, or Firm* — Polson Intellectual Property Law, PC; Margaret Polson; Christopher Sylvain

(57) ABSTRACT

A temperature control device for a battery housing of a vehicle driven by electric motor. The temperature control device is divided into a plurality of temperature control cells. Each cell has a heat exchanger surface for transmitting heat from a battery module to the temperature control device or vice versa, and at least one temperature control agent channel, which is fluidically connected on an inlet or outlet side to a first temperature control agent collector and on its other side to a second temperature control agent collector. The temperature control device has at least one first temperature control agent collector and at least one second temperature control agent collector, wherein each temperature control cell is connected to a first temperature control (Continued)

agent collector and a second temperature control agent collectors by its at least one temperature control agent channel, without connecting to the at least one temperature control agent channel of another temperature control cell.

11 Claims, 6 Drawing Sheets

(51) Int. Cl.
| | |
|---|---|
| *H01M 10/6557* | (2014.01) |
| *H01M 10/625* | (2014.01) |
| *H01M 10/6555* | (2014.01) |
| *H01M 10/647* | (2014.01) |
| *H01M 10/6563* | (2014.01) |
| *H01M 50/20* | (2021.01) |

(52) U.S. Cl.
CPC ... *H01M 10/6555* (2015.04); *H01M 10/6557* (2015.04); *H01M 10/6563* (2015.04); *H01M 10/6568* (2015.04); *H01M 50/20* (2021.01); *H01M 2220/20* (2013.01)

(58) Field of Classification Search
CPC ......... H01M 10/6563; H01M 10/6568; H01M 2/1077; H01M 2/1083; H01M 2/1088; H01M 2220/20; H01M 50/20
See application file for complete search history.

(56) References Cited

U.S. PATENT DOCUMENTS

| | | | | |
|---|---|---|---|---|
| 2009/0142650 | A1* | 6/2009 | Okada | H01M 10/6555 429/71 |
| 2013/0183555 | A1* | 7/2013 | Boddakayala | H01M 10/647 429/72 |
| 2014/0220391 | A1* | 8/2014 | Fujii | B60L 50/66 429/7 |
| 2019/0036092 | A1 | 1/2019 | Günther | |
| 2019/0229311 | A1 | 7/2019 | Günther | |
| 2019/0259994 | A1 | 8/2019 | Günther | |
| 2019/0273231 | A1 | 9/2019 | Günther | |
| 2019/0381899 | A1 | 12/2019 | Günther | |

FOREIGN PATENT DOCUMENTS

| | | | |
|---|---|---|---|
| DE | 102008041365 A1 * | 4/2009 | .......... H01M 10/613 |
| DE | 102010019478 A1 | 11/2010 | |
| DE | 102013200239 A1 | 7/2013 | |
| DE | 102013021670 A1 | 7/2014 | |
| DE | 102013005475 A1 | 10/2014 | |
| JP | 2008059950 A * | 3/2008 | |
| JP | 2009134900 A | 6/2009 | |

OTHER PUBLICATIONS

EPO machine generated English translation of DE-102008041365-A1 (Year: 2009).*
International Search Report dated Feb. 8, 2018 in parent International application PCT/EP2017/068211.
Written Opinion of the International Searching Authority dated Feb. 8, 2018 in parent International application PCT/EP2017/068211.
Office Action dated Jan. 8, 2021 in related Chinese application 201780046761.2.
Office Action dated May 19, 2021 in related Chinese application 201780046761.2.

* cited by examiner

State of the art

TEMPERATURE-CONTROL DEVICE FOR A BATTERY HOUSING OF A VEHICLE

BACKGROUND

The present disclosure relates to a temperature control device for a battery housing of a vehicle, driven by electric motor, said temperature control device being divided into a plurality of temperature control cells, and each temperature control cell having a heat exchanger surface for transferring heat from a battery module, the temperature of which is to be controlled, to the temperature control device or vice versa, plus at least one temperature control agent channel spaced a distance away from the heat exchanger surface, which is fluidically connected on the inlet or outlet sides to a first temperature control agent collector and at least one second temperature control agent collector on the outlet or inlet sides.

In the case of vehicles driven by electric motor, for example, passenger vehicles, forklift trucks or the like, battery modules are used as storage batteries. Such battery modules are typically comprised of a plurality of individual batteries. These batteries are so-called high voltage batteries. Certain requirements are made for the installation of such battery modules that are required for operation of such a vehicle. It is essential for the battery module(s) to be protected from external influences in their battery housings. Furthermore, the accommodation for the battery module(s) in a battery housing must be sealed to prevent penetration of moisture in order to prevent condensate from forming inside the battery housing. Any moisture that penetrates into the battery chamber of a battery housing may result in a short circuit and can trigger a fire in the battery module.

Battery modules with a high energy density and power density are used as electrical energy storage devices. The battery modules heat up during the charging process and also in the discharging process. In rapid charging or discharging processes, this is problematical. High-speed charging processes are currently carried out at rates of up to 150 kW. In the future, charging processes may be carried out at rates up to 300 kW. In such a high-speed charging process, approximately 10% of the energy may be generated as heat output. For this reason, battery housings for electric vehicles are in many cases equipped with an active cooling system to prevent excess heating of the battery modules. Since the battery modules used are typically lithium ion cells or lithium polymer cells which can emit significantly less current at lower temperatures than at higher temperatures, the battery modules are kept in a certain temperature window. Exceeding a certain temperature results in a perceptibly reduced lifetime of the cell or cells of such a battery module. Therefore, the battery module(s) is/are integrated into an active temperature management, by means of which the battery modules are cooled when excessive heating is imminent and are heated when the temperature is too low. Cooling is of primary concern with respect to the temperature management of such battery modules because excessive heating can result in a shortened lifetime or even destruction of the battery modules.

For cooling battery modules accommodated in a battery housing for such purposes, temperature control devices are used, such as those known from DE 10 2013 021 670 A1, for example. This known temperature control device, designed as a cooling element or heat sink, has a coolant collector on the inflow side and a coolant collector on the outflow side. The two coolant collectors are spaced a distance apart from and connected to one another by coolant channels. The top side of the cooling channels leading to the battery modules forms a heat exchanger surface, with which the battery modules to be cooled are in contact. The two coolant collectors are a distance apart from one another so that a plurality of battery modules may be arranged side by side on the heat exchanger surface. The heat exchanger surface of this prior art is structured in an asymmetrical waveform to accommodate the battery modules. Each row of battery modules is arranged in a cooling cell of this known cooling element. In terms of the concept, the cooling element known from this document is an offshoot cooling element.

Furthermore, US 2007 00 26 301 A1 discloses a battery module comprised of a plurality of batteries. A battery module is formed by such a plurality of batteries together with a housing accommodating this plurality of batteries. Furthermore, the battery module disclosed therein also comprises a coolant channel divided by a divider into a plurality of coolant channels inside the one battery module.

In addition to temperature control devices that may be constructed according to the principle of offshoot cooling elements, those in which the temperature control agent channels are configured in a meandering pattern over the surface of a panel are also used.

In addition to the aforementioned temperature management, there is also the desire for battery modules accommodated within a battery housing to be kept at the same temperature, if possible, so that all the battery modules used in such a battery housing will undergo similar aging.

Furthermore, there is the requirement that the battery module temperature management device be designed to be as small as possible.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Against this background, an aspect of the present disclosure is to improve upon a temperature control device of the type defined in the introduction, such that it not only improves the cooling efficiency but also permits a more uniform temperature control of the battery modules, the temperature of which is to be controlled by this temperature control device.

This is achieved by a temperature control device as defined in the introduction, wherein the temperature control device comprises at least one first temperature control agent collector and at least one second temperature control agent collector, wherein each temperature control cell of the temperature control device is connected to the at least one first and at least one second temperature control collector with its at least one temperature control agent channel, without the intermediate connection of the at least one temperature control agent channel of another temperature control cell, so that when the first temperature control agent collector is embodied as an inflow collector, the supplied temperature control agent is discharged via the plurality of second temperature control agent collectors that serve as return collectors and/or so that when the first temperature control agent collector is embodied as a return collector, the temperature control agent supplied via the second temperature control agent collector, which serves as an inflow collector in this design, is discharged via the first temperature control agent collector.

With this temperature control device, at least two second temperature control agent collectors of a double row or multi-row offshoot cooling element are associated with a first temperature control agent collector. With the same temperature control area, this makes it possible to design the temperature control cells to be smaller. In the case of cooling in particular, this results in more efficient cooling of the battery modules because the distances to be traveled by a temperature control agent through the at least one temperature control channel of a temperature control cell between the inflow side and the outflow side may be designed to be shorter and typically are designed to be shorter. When a first coolant collector and two second coolant collectors are provided, this doubles the number of available cooling cells for the same temperature control area in comparison with a known temperature control device. Despite the fact that the number of cooling cells is doubled in the embodiment described previously, the effective volume of a battery housing equipped with such a temperature control device can be increased in comparison with that of a traditional device. This was not expected.

In a first embodiment, it is provided that the first temperature control agent collector represents the inflow. The temperature control agent channels of the two rows of temperature control cells are connected to this inflow and lead away in different connections. The temperature control cells are connected to this temperature control agent collector in the manner of offshoots at the inlet side. At the outlet side, the first temperature control agent channel offshoot row is connected to one of the two second temperature control agent collectors, while the temperature control agent channels of the other row are connected to the other second temperature control agent collector. In this way, for example, there is a supply of coolant through the first or central temperature control agent collector, so that the temperature control agent channels of the temperature control cells of the two rows of offshoots are acted upon by temperature control agents at the same temperature at the input end. In this embodiment, there is preferably the same division of the amount of coolant supplied to the temperature control agent channels of the two rows of offshoots, whereas only half the amount of coolant must be discharged through each temperature control agent collector at the outflow end. In this design, preheated coolant is therefore not sent through a temperature control cell arranged upstream, which in that case, the cooling output of the downstream temperature control agent cell would be lowered in comparison with the cooling output of the upstream temperature control agent cell.

In another embodiment, it is provided that the temperature control agent inflow takes place via the at least two second temperature control agent collectors, and the return takes place via the first or central temperature control agent collector. This embodiment also yields the same advantages as those described previously with regard to the first embodiment. A combined embodiment of this embodiment and the embodiment described previously is also possible.

As is customary with the traditional offshoot cooling elements, the connecting cross section of the temperature control agent channels of the temperature control cells connected to the first or central coolant collector may be designed to be larger in the inflow direction to ensure the same volume flow is introduced into the temperature control channels.

Such a temperature control device may have a thermally conducting connection, for example, connected to the bottom side or to the top side of the bottom of a battery housing. It is also readily possible to integrate such a temperature control device into a battery housing, namely by forming the bottom of the battery housing on which the battery modules sit in the individual temperature control cells.

Such a temperature control device may be formed, for example, by the combination of two panel parts, wherein channels are formed in a first part, for example, by embossing if the first part is a metal part, which would usually be the case. These open channels are covered by a second part. The two parts are joined to one another in a fluid-tight manner. Therefore, the channels introduced into the first part are sealed by the second part. According to one embodiment, the surface of the second part which is opposite the channel closing side forms the heat exchanger surface. In such an embodiment, at least the part of the temperature control device comprising the available heat exchanger surface is made of a material, such as a metal, that conducts heat well.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is described below on the basis of embodiments with reference to the accompanying figures, wherein.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting.

Also, the terminology used herein is for the purposes of description and not limitation.

DETAILED DESCRIPTION

Figure 1:
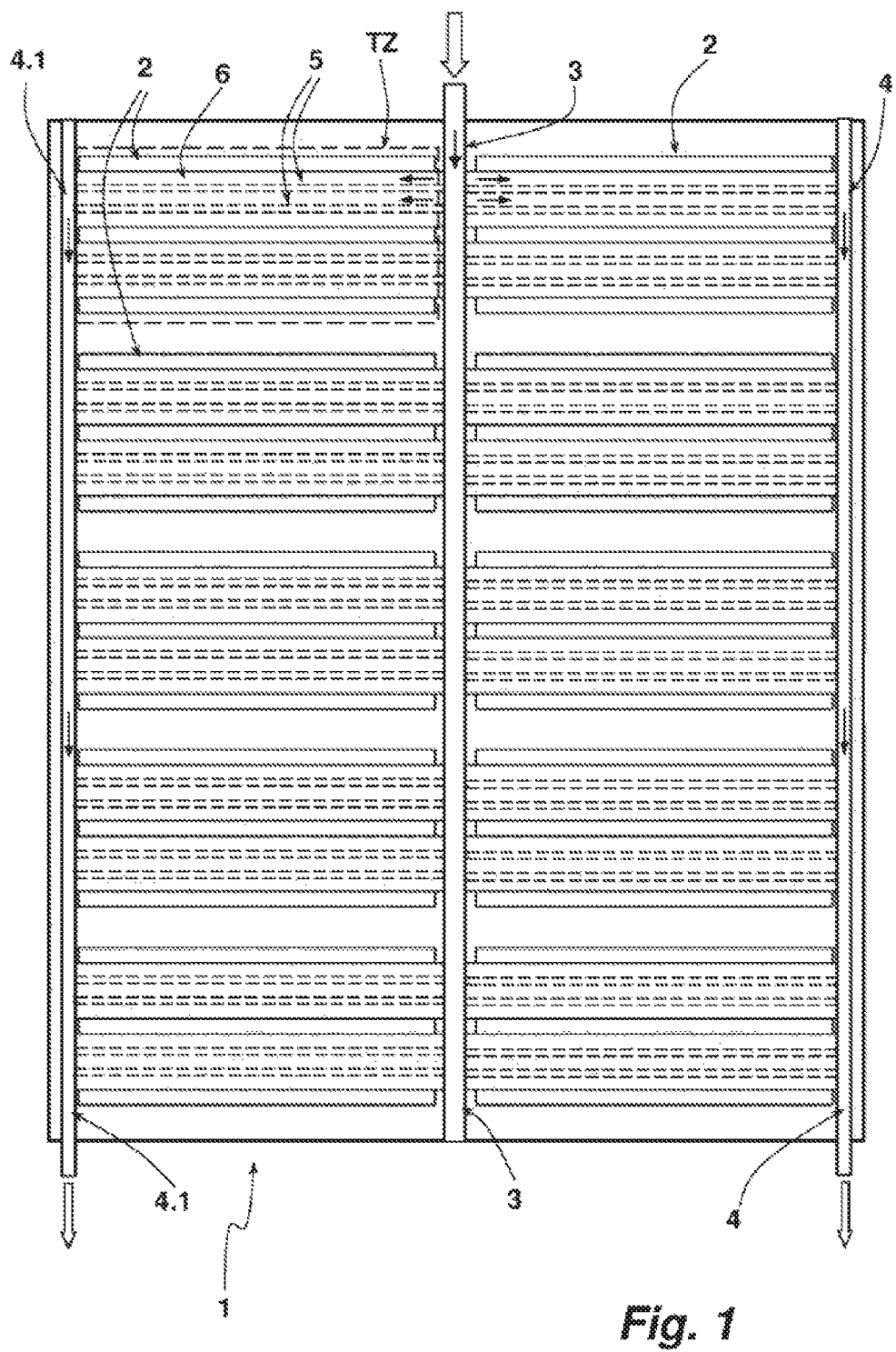
FIG. 1 shows a schematic diagram of the hydraulic pathway in a temperature control panel of a battery housing provided for use in a vehicle according to a first embodiment.

FIG. 1 shows schematically a temperature control device designed as a temperature control panel 1 for a battery housing (not shown in greater detail in this figure) of a vehicle driven by electric motor. The temperature control panel 1 in the illustrated embodiment forms a heat exchanger part for a battery housing. A lower bottom plate cover has been removed to allow inspection. The surface made available by the battery housing 11 (see FIG. 4) for the battery modules 2 has been subdivided into a plurality of temperature control cells by the temperature control panel 1. In the embodiment shown here, a battery module 2 is accommodated in each temperature control cell. The battery modules 2 are each placed in a temperature control cell on the top side (not visible in FIG. 1) of the temperature control panel 1. To make the positioning of the battery modules 2 on the temperature control panel 1 discernible, a bottom plate arranged between the battery modules 2 and the temperature control panel 1 is not shown.

The hydraulic pathway of the temperature control panel 1 comprises a first temperature control agent collector 3, which serves as the inflow collector. This inflow collector 3 is situated centrally with respect to its base area according to the longitudinal extent of the temperature control panel 1. Two second temperature control agent collectors 4, 4.1, each representing a return collector, are located on the longitudinal sides of the temperature control panel 1. The cross-sectional area of the inflow collector 3 is twice as large as the cross-sectional area of each return collector 4, 4.1. Two heat exchanger parts 6 each having two temperature control agent channels 5 are arranged between the inflow collector 3 and each return collector 4, 4.1 in each temperature control cell accommodating a battery module 2. Each surface forms a heat exchanger surface of these heat exchanger parts 6 facing the battery modules 2. This heat exchanger surface is in a thermally-conducting connection to the bottom side of the bottom plate (not shown in this figure). The bottom plate at the same time also serves to distribute heat, so that in the case of cooling, there is improved dissipation of heat from the respective battery module 2 to the heat exchanger parts 6, which serve as the heat sink in cooling of the battery modules 2. The heat exchanger parts 6 are arranged in the manner of offshoots between the forward flow connector 3 and the respective return collector 4 and/or 4.1. The heat exchanger parts 6 have at least one temperature control agent channel; the heat exchanger parts 6 of the depicted embodiment each have two temperature control agent channels 5 running parallel to one another. The temperature control agent channels 5 are connected at the inlet end to the inflow collector 3 and at the outlet end to the corresponding return collector 4 or 4.1. The flow-through direction of the inflow collector 3, of the temperature control agent channels 5, and of the return collectors 4, 4.1 is represented by arrows in this figure. For example, a temperature control cell TZ is identified in this figure. The temperature control cells TZ represent the area of the temperature control panel 1 that is connected in a heat-conducting manner to such a battery module 2 for the purpose of temperature control of the battery module 2. It is self-evident that instead of the battery module 2 shown in each temperature control cell TZ in the figures, a plurality of smaller battery modules may also be arranged there. Inflow connections and return connections on the collectors 3, 4, 4.1, with which the temperature control panel 1 is connected to the other components of a temperature control agent circulation, are not shown in the figure. The heat exchanger parts 6 are manufactured from a material, such as an aluminum alloy, that conducts heat well, for example, by an extrusion process.

With the temperature control panel 1 of FIG. 1, the amount of temperature control agent supplied via the inflow collector 3 is divided uniformly among the temperature control agent channels 5 of the heat exchanger parts 6, which lead away from the inflow collector 3 to the right and left in the figure. Thus, temperature control agent at the same temperature is supplied to each heat exchanger part 6 cooling the battery modules 2. All the battery modules 2 inside the battery housing, whose temperature is controlled by the temperature control panel 1, thus have their temperature controlled uniformly because no temperature control cell TZ receives temperature control agent whose temperature has been influenced by temperature control of a different temperature control cell TZ of the temperature control panel 1. This applies in particular to cooling the battery modules 2, because this is more critical for the lifetime of the battery modules 2.

Studies with this temperature control panel 1 have shown that, because of the supply of temperature control agent at the same temperature in all temperature control cells in cooling, the effective cooling output has not only been improved significantly in comparison with that of previously known temperature control panels of the type in question, but this has also been achieved with a lower cooling power—lower required delivery rate and/or smaller amount of coolant.

The return collectors 4, 4.1 have smaller diameters, which makes it possible to accommodate them in less space in the battery housing design, so it is possible to reduce the required installation space in this way in comparison with traditional temperature control panels. Uniform cooling of all the battery modules 2 in the battery housing, as described previously, is manifested not only in improved cooling power but also in the fact that the aging and lifetime of the battery modules are of equal progression and length.

Figure 2:
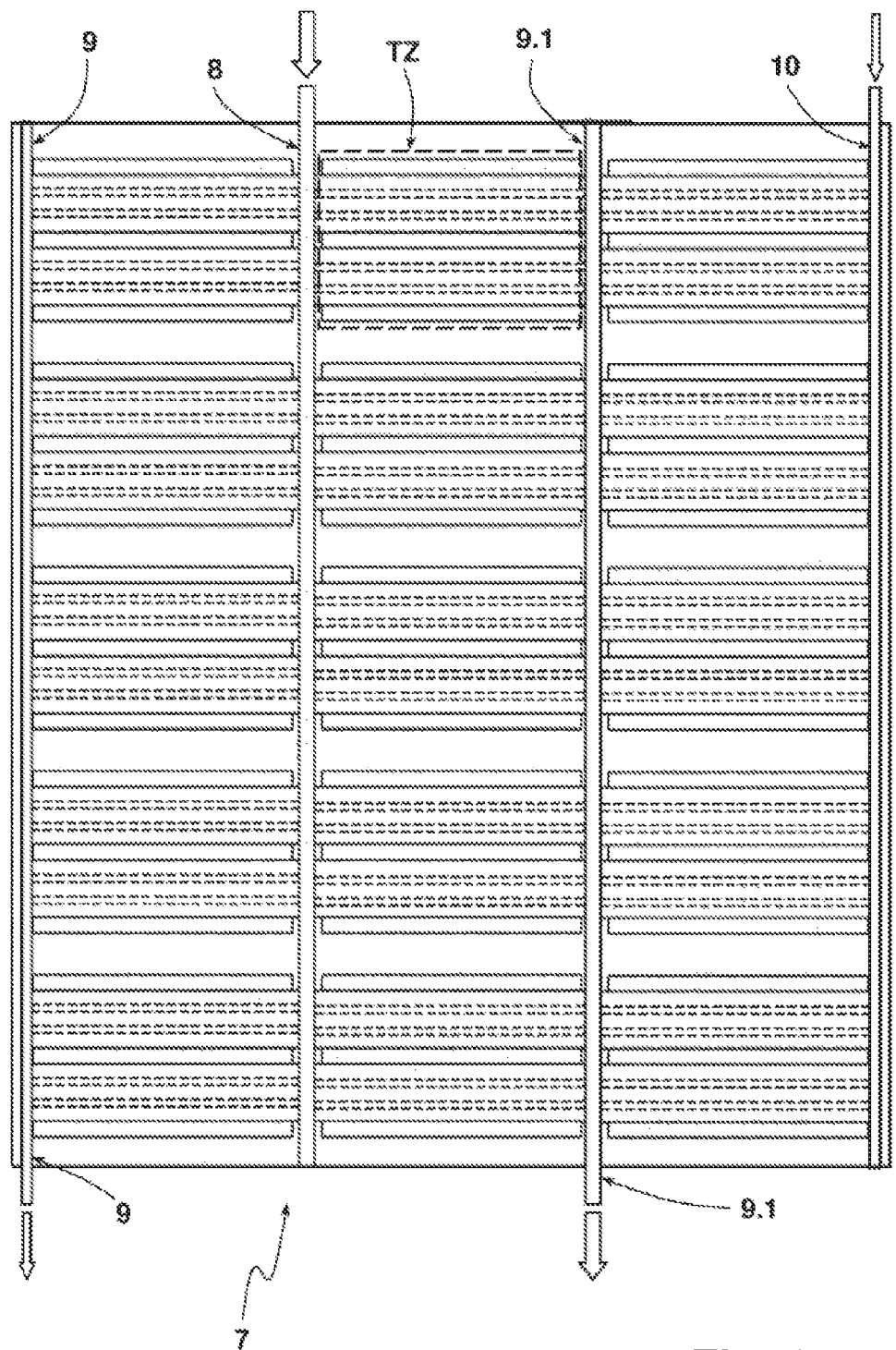
FIG. 2 shows a schematic diagram of the hydraulic pathway in a temperature control panel of a battery housing provided for use in a vehicle according to another embodiment.

FIG. 2 shows another temperature control panel 7, which has been expanded by one row of offshoots on heat exchanger parts in comparison with the temperature control panel 1. The concept described for the temperature control panel 1 in FIG. 1 is implemented in the temperature control panel 7, in which the amount of temperature control agent supplied is divided between two return collectors. In the embodiment in FIG. 2, the inflow collector in this regard is labeled with reference numeral 8. The temperature control agent supplied via the inflow collector 8 is removed via the return collectors 9, 9.1 after passing through the heat exchanger parts of the individual temperature control cells, as already explained with regard to the embodiment of the temperature control panel 1 in FIG. 1. The return collector 9.1 of the temperature control panel 7 has a cross-sectional area, which corresponds to the inflow collector 8 and through which the flow can pass. This is necessary in this embodiment because the third row of offshoots at the right in FIG. 2 is connected to a second inflow collector 10 and receives the temperature control agent from this second inflow collector 10. The return for this supplied amount of temperature control agent is provided by the return collector 9.1, which is thus responsible for the return of the temperature control agent supplied via the inflow collector 10 and half of the temperature control agent supplied via the inflow collector 8.

Figure 3:
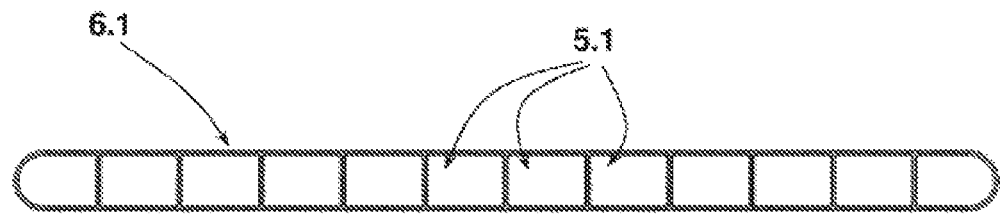
FIG. 3 shows a schematic cross section through a heat exchanger part according to another embodiment.

FIG. 3 shows in cross-section another heat exchanger part 6.1, which can be used instead of the heat exchanger parts 6 in the embodiments of FIGS. 1 and 2. Heat exchanger part 6.1 is an extruded aluminum profile having a plurality of temperature control agent channels 5.1. All these channels have temperature control agent flowing through them in the same direction.

Figure 4:
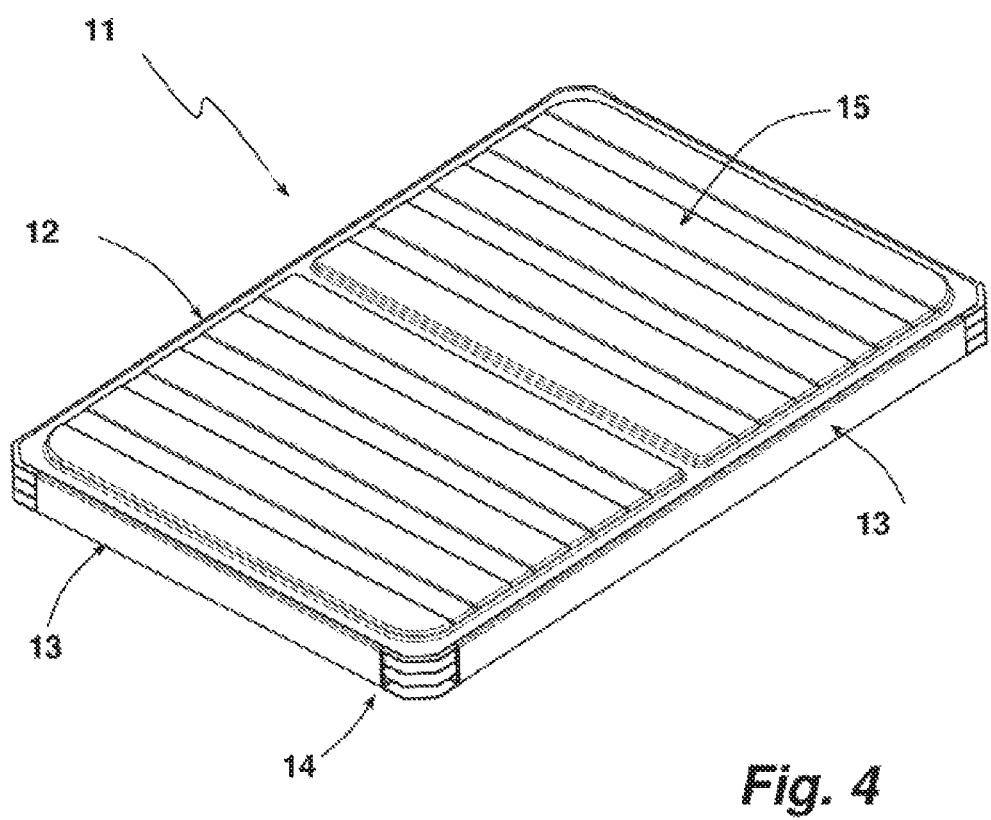
FIG. 4 shows a perspective view of a battery housing of a vehicle driven by electric motor having a temperature control panel according to the embodiment illustrated in FIG. 1.

FIG. 4 shows a battery housing 11 according to one embodiment. The battery housing 11 comprises a frame 12 made up of a plurality of hollow chamber profiles 13, said hollow chamber profiles being interconnected by corner pieces 14. At the top side, the battery chamber of the battery housing 11 accommodating the battery modules is closed by a cover 15.

Figure 5:
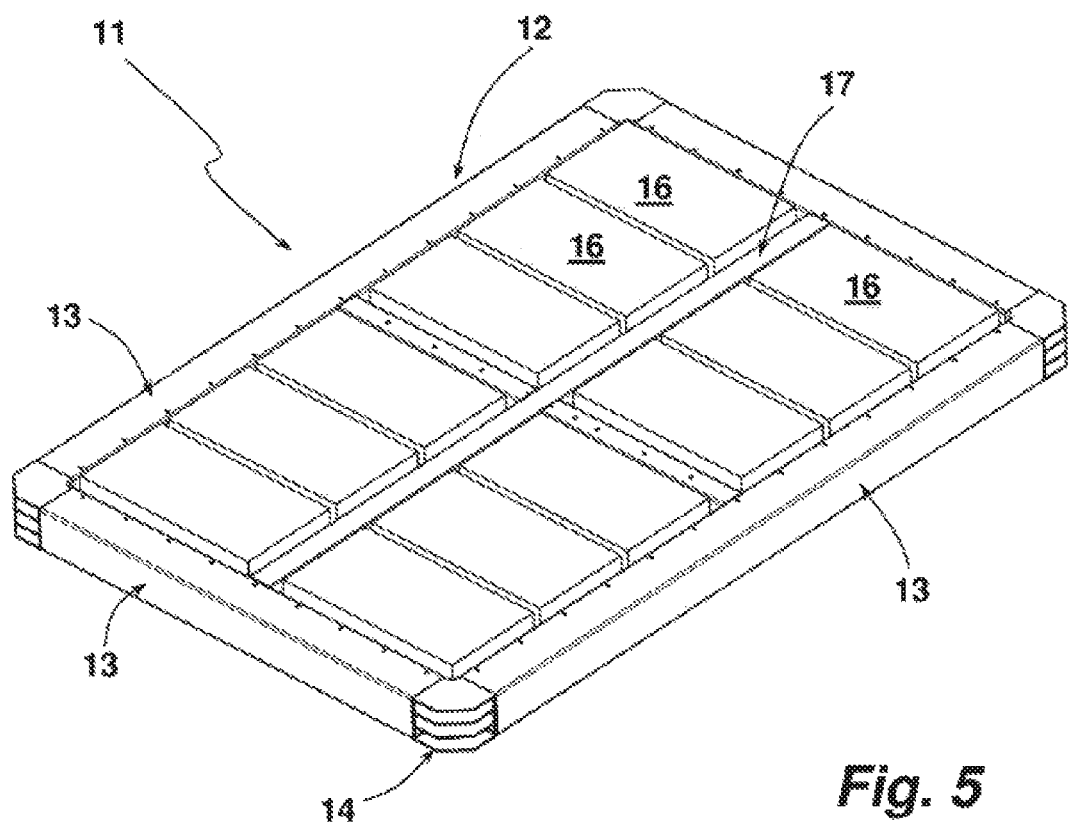
FIG. 5 shows the battery housing from FIG. 3 with the cover removed.

FIG. 5 shows the battery housing 11 with the cover 15 removed and allows insight into the battery chamber of the battery housing 11. A total of 12 battery modules 16 are accommodated in the battery housing 11. Each battery module 16 includes a plurality of individual battery cells combined together. The battery modules 16 are arranged at a distance from one another and are each situated in a temperature control cell. The two rows of batteries 16 are separated from one another by a side member 17. Furthermore, a cross member divides the two rows of battery modules.

Figure 6:
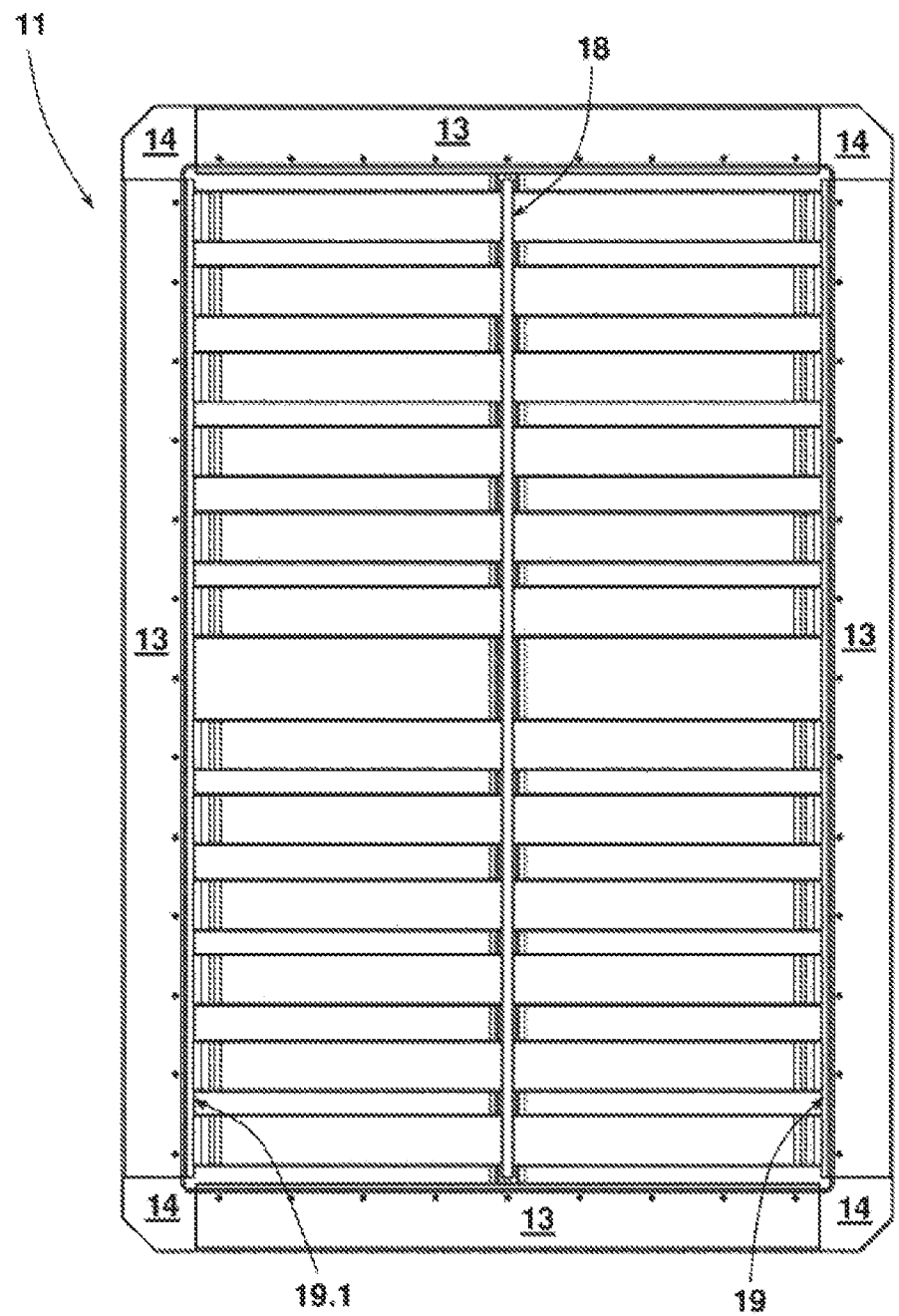
FIG. 6 shows a bottom view of the battery housing from FIGS. 4 and 5.

A temperature control panel such as that described previously based on FIG. 1 is integrated into the battery housing 11. The lower view of the battery housing in FIG. 6 shows the central inflow collector 18 and the two return collectors 19, 19.1, connected to one another by corresponding heat exchanger parts 20. The temperature control agent channels introduced into the heat exchanger parts 20 are not shown in this figure for the sake of simplicity.

Figure 7:
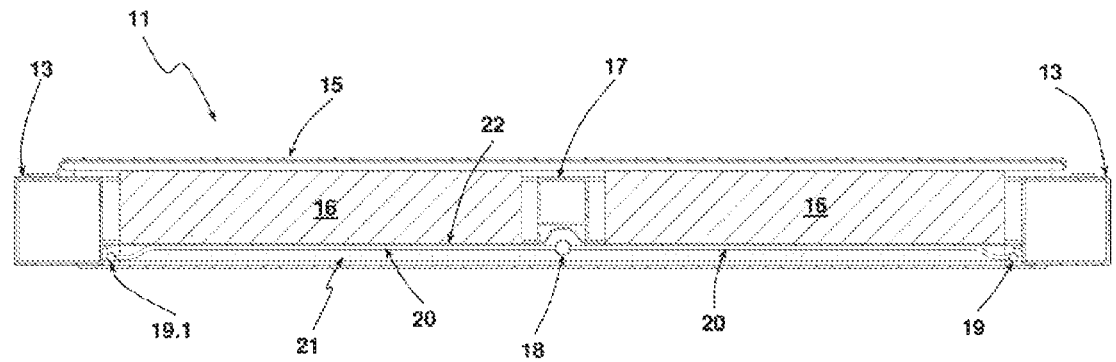
FIG. 7 shows a cross-sectional diagram through the battery housing from FIG. 4.

Thus, the hydraulic paths, and in particular the collectors 18, 19, 19.1, are also protected from external damage by the frame 12, because they are on the inside thereof, and to this end have corresponding impressions and indentations (see FIG. 7, among others). Likewise, a design in which the collectors of such a temperature control panel are accommodated inside the hollow chamber profiles or in impressed shapes (here: indentations) of these profiles is also possible. Recesses to accommodate collectors are preferably designed in the corners of such profiles.

The sectional diagram in FIG. 7 illustrates the design of the temperature control panel 21 in this embodiment with its inflow collector 18, its return collectors 19, 19.1 and the heat exchanger parts 20 connecting the inflow collector 18 to each return collector 19, 19.1. The heat exchanger surfaces of the heat exchanger parts 20 are connected with a heat-conducting connection to the bottom side of a bottom plate 22 extending over the entire bottom area of the battery chamber of the battery housing 11. The bottom plate 22 in the embodiment illustrated here is a steel plate. The heat exchanger surfaces of the temperature control panel 21 are connected to the bottom plate 22 in a manner that conducts and/or transmits heat well, as is essentially known.

The cross-sectional diagram in FIG. 7 also illustrates that, as a result of the return collectors 19, 19.1 having a smaller diameter than the inflow collector 18, the total height of the battery housing 11 can be designed to be smaller in comparison with that of a temperature control panel in which a return collector has the same diameter as the inflow collector.

Figure 8:
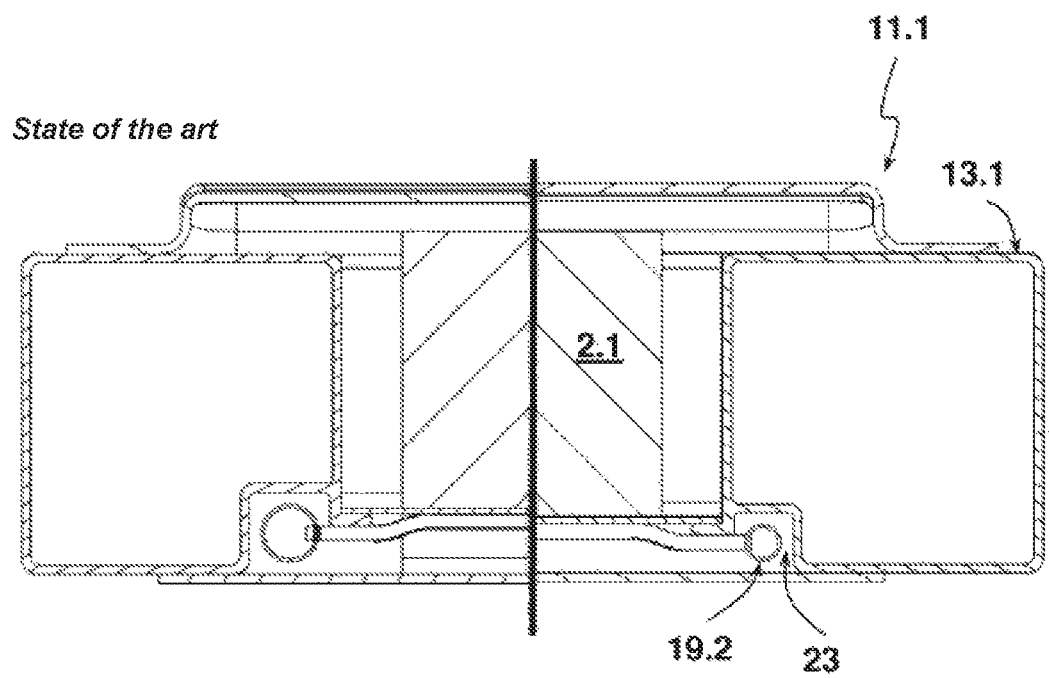
FIG. 8 shows a partial cross-sectional diagram through a battery housing according to another embodiment in comparison with a known battery housing.

FIG. 8 shows an alternative embodiment of a battery housing 11.1 (right) shown in a partial cross section, including one of its hollow chamber profiles 13.1, which has an indentation inward in the area of one edge along its longitudinal extent. The indentation provides installation space for the return collector 19.2 shown in this figure. A detail of a traditional battery housing (left), whose return collector has the same cross-sectional area as the inflow collector and is therefore designed to be larger than the return collector 19.2 in this embodiment, is compared with the battery housing 11.1. Accordingly, the required design of the indentation 23 in providing installation space for the return collector 19.2 is smaller in comparison with the previously known indentation on the left. This provides a greater stiffness of the hollow chamber profile 13.1 and allows a larger volume to be formed to accommodate battery modules 2.1 in the temperature control cells. In the embodiment shown here, the additional battery volume thereby obtained is approx. 10% larger than that of a comparative battery housing from the state of the art. Conversely, the smaller installation height can be utilized for a battery housing design that is smaller and therefore weighs less with the same battery power, and therefore save space and reduce weight.

In the embodiments illustrated in the figures, the collectors run in the longitudinal extent of the respective battery housing. In these embodiments, the transverse extent is shorter than the longitudinal extent. This arrangement has been selected for the embodiments presented here because then the flow distance from the respective inflow collector to a return collector is shorter due to the heat exchanger parts. Likewise, the invention can also be implemented in a design in which the collectors are aligned in the transverse direction in a battery housing having a rectangular base area and the heat exchanger parts are aligned in the longitudinal direction.

The invention has been described on the basis of embodiments. Without going beyond the scope of the valid claims, those skilled in the art will see numerous other embodiments for implementing the invention. Thus the invention can also be implemented, for example, by providing a chambered pipe as the inflow collector serving as the first temperature control agent collector in the embodiments, wherein each chamber of such a collector acts upon the row of heat exchanger parts. It is also possible to provide such a collector with a plurality of individual pipes. In addition, it is possible to provide that the rows of heat exchanger parts are arranged at angles to one another, in contrast with the illustration of the same in the figures where they are arranged in one plane. Such a design allows an embodiment in which, for example, heat is dissipated from a battery module into two temperature control cells. Furthermore, it is possible to connect the heat exchanger surface or surfaces of the temperature control device at the top for temperature control of battery modules. Particularly effective temperature control is obtained when the battery modules, whose temperature is to be controlled, are regulated on two sides, for example, on their bottom side and also on their top side, as illustrated in the figures.

The temperature control devices as described previously may also be integrated into a battery housing so that the battery modules, whose temperature is to be controlled, are in direct contact with a heat exchanger surface or an area of heat exchanger surface of the temperature control device.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Temperature control panel
2, 2.1 Battery module
3 First temperature control agent collector/inflow collector
4, 4.1 Second temperature control agent collector/return collector
5, 5.1 Temperature control agent channel
6, 6.1 Heat exchanger part
7 Temperature control panel
8 Inflow collector
9, 9.1 Return collector
10 Inflow collector
11, 11.1 Battery housing
12 Frame
13, 13.1 Hollow chamber profile
14 Corner piece
15 Cover
16 Battery module
17 Side member
18 Inflow collector
19, 19.1, 19.2 Return collector
20 Heat exchanger part
21 Temperature control panel
22 Bottom plate
23 Indentation
TZ Temperature control cell

The invention claimed is:

1. A temperature control device for a battery housing of a vehicle driven by electric motor, comprising:
a plurality of temperature control cells, the temperature control device being divided into the plurality of temperature control cells;
each temperature control cell having a heat exchanger surface for transferring heat from a battery module, the temperature of which is to be controlled, into the temperature control device or vice versa;
at least one first temperature control agent collector;
at least two second temperature control agent collectors;
wherein each first temperature control agent collector is associated with two second temperature control agent collectors and in fluid communication therewith via temperature control agent channels;
wherein each temperature control cell has at least one temperature control agent channel for a temperature control agent, the at least one temperature control agent channel spaced a distance apart from the heat exchanger surface, the at least one temperature control agent channel is fluidically connected at one end to a first temperature control agent collector of the at least one first temperature control agent collector, and at an opposite end to one of the second temperature control agent collectors associated with said first temperature control agent collector of the at least one first temperature control agent collector;
wherein a fluid connection between each first temperature control agent collector and its second temperature control agent collectors associated therewith is only provided by the at least one temperature control agent channel connecting the first temperature control agent collector with the respective second temperature control agent collector;
wherein each temperature control cell is connected to a first and a second temperature control agent collector with its at least one temperature control agent channel, without an intermediate connection to the at least one temperature control agent channel of another temperature control cell;
wherein when the first temperature control agent collector serves as an inflow collector, the temperature control agent supplied via the first temperature control agent collector is discharged via the two second temperature control agent collectors serving as return collectors, and/or when the first temperature control agent collector serves as a return collector, the temperature control agent supplied via the two second temperature control agent collectors serving as inflow collectors is discharged via the first temperature control agent collector;
wherein the cross-sectional area of each second temperature control agent collector is smaller than the cross-sectional area of the first temperature control agent collector associated therewith; and
wherein the heat exchanger surface of the temperature control cells is connected to the bottom of the battery housing from below or to an intermediate plate of the battery housing from above.

2. The temperature control device of claim 1, wherein the temperature control device is the bottom of the battery housing, and each of the battery modules is in contact with the heat exchanger surface of a temperature control cell.

3. The temperature control device of claim 1, wherein the temperature control device is designed as a temperature control panel.

4. The temperature control device of claim 3, further comprising at least two panel parts divided in a plane of the temperature control panel, wherein at least one first panel part has channels that are open to a second panel part, the channels are covered by the second panel part to form closed temperature control agent channels, and a surface opposite the channels of the second part forms the heat exchanger surface for the temperature control cells.

5. The temperature control device of claim 4, wherein the second panel part is a bottom plate of the battery housing which is sealed in relation to a side wall of the battery housing.

6. The temperature control device of claim 1, wherein the first and second temperature control agent collectors are arranged in bulges or indentations in frame parts of the battery housing.

7. The temperature control device of claim 6, wherein the indentations are embodied as edge indentations.

8. The temperature control device of claim 1, wherein the first temperature control agent collector is embodied as a chambered pipe having at least two chambers, and each chamber of the first temperature control agent collector acts upon a row of temperature control cells.

9. The temperature control device of claim 1, wherein rows of temperature control cells are arranged in a common plane.

10. The temperature control device of claim 1, wherein rows of temperature control cells are arranged in planes at angles to one another.

11. The temperature control device of claim 1, wherein the temperature control device is part of the battery housing of a vehicle driven by electric motor.

* * * * *